No. 12,374. REISSUED AUG. 1, 1905.
A. DE VILBISS, JR.
RECORDING LOCK.
APPLICATION FILED JUNE 15, 1904.
2 SHEETS—SHEET 1.
Fig. I.
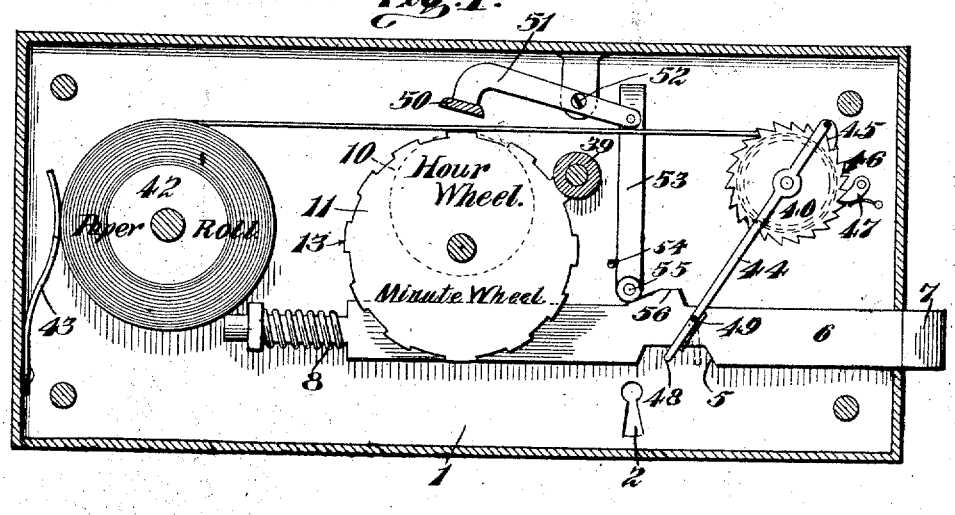
Fig. II.
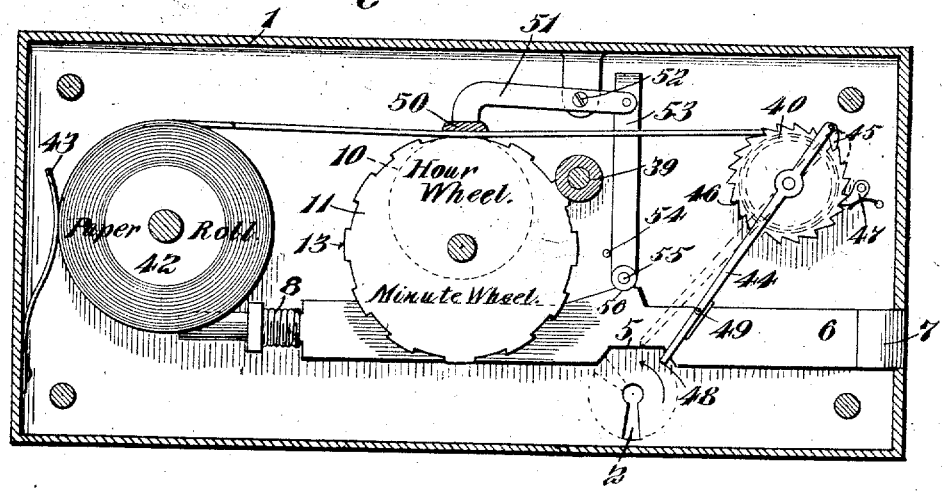
Inventor:
Allen De Vilbiss, Jr.
Witnesses:
Eugene M. Sliney
H S Hill
By
Collamer & Co., Attorneys.

No. 12,374.
REISSUED AUG. 1, 1905.
A. DE VILBISS, JR.
RECORDING LOCK.
APPLICATION FILED JUNE 15, 1904.
2 SHEETS—SHEET 2.
FIG. III.
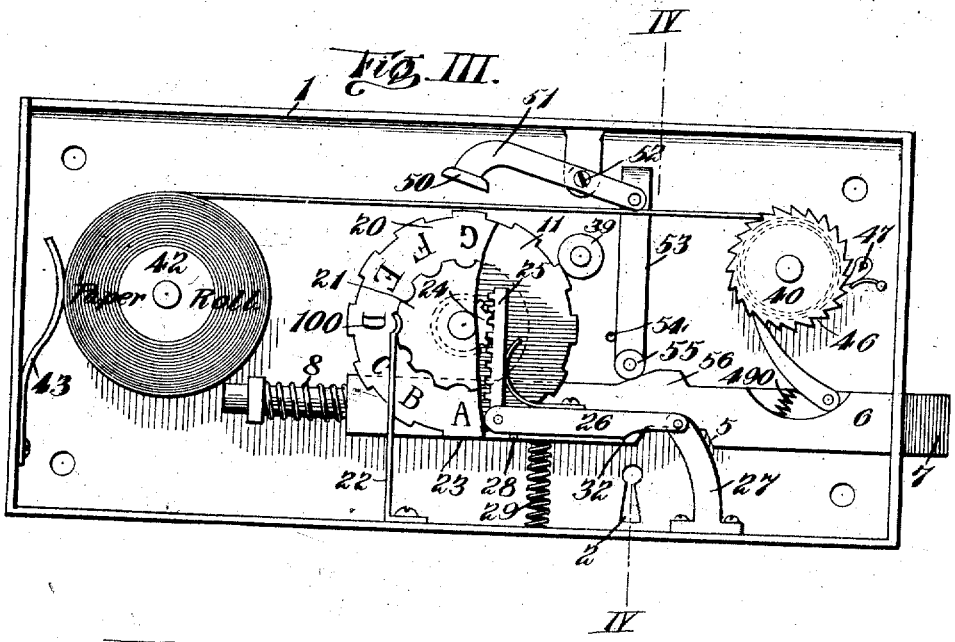
FIG. IV.
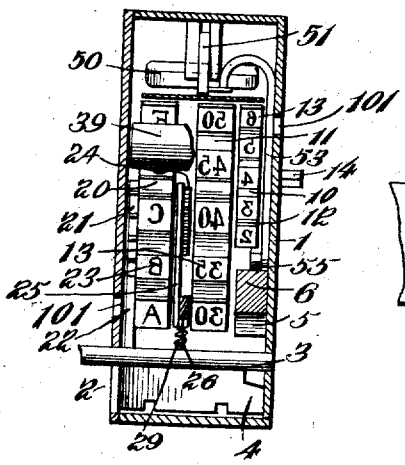
FIG. V.
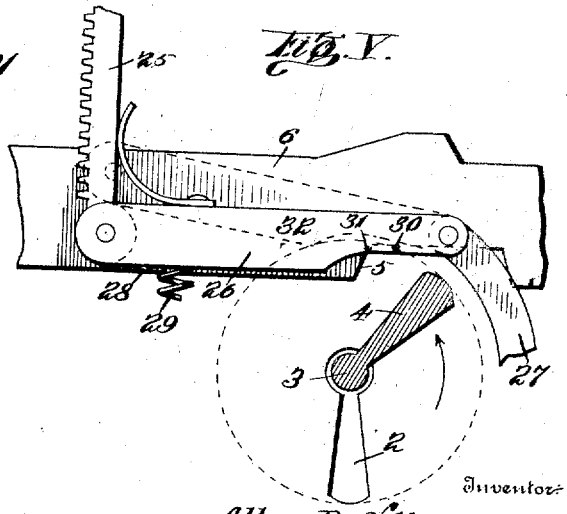
Witnesses:
Eugene M. Sliney
H. S. Hill
Inventor:
Allen De Vilbiss, Jr.,
By Collamer & Co., Attorneys.

BEST AVAILABLE COPY

UNITED STATES PATENT OFFICE.

ALLEN DE VILBISS, JR., OF TOLEDO, OHIO, ASSIGNOR, BY DIRECT AND MESNE ASSIGNMENTS, OF FIVE-SIXTHS TO JOHN F. PIXLEY AND ONE-SIXTH TO CLARENCE H. PUMPHREY, BOTH OF COLUMBUS, OHIO.

RECORDING-LOCK.

No. 12,374. Specification of Reissued Letters Patent. Reissued Aug. 1, 1905.

Original No. 735,034, dated July 28, 1903. Application for reissue filed June 15, 1904. Serial No. 212,734.

*To all whom it may concern:*

Be it known that I, ALLEN DE VILBISS, Jr., a citizen of the United States, and a resident of Toledo, in the county of Lucas and State of Ohio, have invented an Improvement in Recording-Locks, of which the following is a specification.

This invention relates to recorders, more especially to that class known as "recording-locks," such as are actuated by any one of several individuals; and the object of the same is to produce a recording-lock which each time it is opened will furnish a correct record to designate the hour and minute when such opening occurred and a correct record to designate the operator, as by identifying the key which was employed.

Experience has taught the proprietors of some establishments whose employees know the combination or have keys of their own that on occasions some person possessing such combination or key may return after hours, enter the establishment with, perhaps, foul intent, remain therein for some time, and then depart, and heretofore the employer, who may reside elsewhere, has no means of knowing what has occurred unless he should later discover some of the results.

The object of the present invention is to devise a lock for the main or front door of the establishment which shall contain a recording mechanism of such construction that it will make a record of the time when such entry into the building was effected and by whom and will make another record when the lock was again opened to permit exit from the building, thus furnishing the employer with knowledge which will serve as a check upon those who thus enter and leave the building. It is obvious that an almost endless combination of mechanisms can be employed for carrying out this general idea, and I desire it distinctly understood that the present specification and drawings are intended to set forth only one of many constructions and arrangements which might be used.

Herein I have employed broad terms, especially in the claims, and in the specification and drawings I have set forth specifically the construction of the elements broadly covered by those terms merely in order to explain one form of each element and one arrangement of the whole which occurs to me at this time.

To this end the invention consists in a lock of any type which will answer, with which is combined and associated a designating mechanism of the type hereinafter set forth.

In the accompanying drawings, Figure I is a central longitudinal section of the lock with the bolt shot. Fig. II is a similar section with the bolt retracted, showing in dotted lines how the actuating-lever of the paper-feed is sprung over the key-bit. Fig. III is an elevation of the lock with the front plate removed, showing the bolt as shot and illustrating more particularly the key-indicator, which is located to this side of and does not appear in the two previous views. This figure also shows a modification of the paper-feed, which is perhaps a better construction than that elsewhere illustrated. Fig. IV is a transverse section on the line IV IV of Fig. III. Fig. V is a diagrammatic view illustrating the action of the key-bit on the key-indicator-setting lever.

The lock proper comprises a casing 1, which in the present case has a keyhole 2, in which is intended to work a key having a shank 3 and a bit 4, as shown. The latter enters a notch 5 in the bolt 6, which in this case has a beveled front end 7, and is thrown normally forward by a spring 8, as usual in what are known as "spring-locks." It is not necessary to illustrate other features of the lock, and it will be clear that the latter need not necessarily be of the spring type. However, the term "bolt" used herein is intended to designate that part of the lock which engages with a keeper to lock the door closed.

The recording mechanism as a whole is actuated through the movement of that element which moves the bolt, here shown as the key, the latter in the present construction acting directly on certain parts and acting indirectly through the bolt on other parts, all as more fully described below; but it is the insertion and movement of the key in the lock which produces the record. In the present case the latter comprises a time-record and a key-record, the former indicating the time when the key was used on each occasion of its use and the latter indicating which key was used. In the present instance the keys are differentiated from each other by slight differences in the radial lengths of their bits; but it will be understood that differences in the longitudinal

BEST AVAILABLE COPY lengths thereof or in the shape of the bits could be made use of to the same end. The recording mechanism as a whole comprises in the present instance a time-indicator, a key-indicator, an inker for both, a paper-roll from which a strip is drawn over both indicators by a paper-feed, and a recorder proper, and these parts will now be described separately.

The time-indicator in the present instance comprises an hour-wheel 10 and a minute-wheel 11, connected by gearing 12 and so mounted that their upper faces stand flush beneath the paper. These wheels are of the drum type and have characters 13 on their peripheries. In the present case these are printing characters or type rising above the drum-faces; but they could be dies which would indent or puncture the record-strip described below. Preferably within the hour-wheel is located a clock mechanism adapted to be wound by the spindle 14, which mechanism is so arranged as to turn the minute-wheel one-twelfth of a revolution every five minutes and to turn the hour-wheel one-twelfth of a revolution every hour; but any arrangement will answer which will cause this time-indicator to have a movement (preferably intermittent) so that its uppermost characters shall constantly indicate the exact or approximate time.

The operator-indicator herein shown comprises a wheel 20, also of the drum-type and having characters 23 on its periphery, which may be letters or words, to indicate the various keys employed. This drum may well be mounted on the shaft of the larger time-wheel, and it may have a hub 21 with a roughened or notched periphery against which presses the tip of a retaining-spring 22 for the purpose of steadying the wheel while in use. Its hub, possibly at the other side of its body, may be provided with a pinion 24, engaged by a rack-bar 25, pivotally supported at one end of lever 26, whose other end is pivoted in a bracket 27, the lever being drawn into normal position against a stop 28 by a spring 29. This lever stands in the present instance above the keyhole, as best seen in Fig. V, and along its lower edge it has an active face which is practically straight from 30 to 31, where it merges into a neutral face extending from 31 to 32 and struck on an arc corresponding substantially with that described by the outer end of the key-bit 4. As the key turns in the direction of the arrow in this view it first strikes the point 30, and as it travels to the point 31 it raises the setting-lever, which raises the rack-bar, which rotates the key-indicator and brings uppermost thereon a certain character corresponding with the length of the key-bit and the height to which the active face was raised. Next the bit strikes the edge of the notch 5 in the bolt 6 and performs the work described below. Reaching the point 31, which has now been raised to the dotted lines, the bit travels around the neutral face of the lever 26 to the point 32. During this travel it does no work, and the retaining-spring 22 holds the key-indicator steady.

The inker 39 may be of any type; but in the present instance it is simply a roller mounted on a suitable bearing and faced with felt or an equivalent cushion, which bears constantly on the characters of the wheels passing beneath it, the felt being moistened with ink from time to time. If the indicators are of the die form, which impress or cut the record-strips, the inker will be omitted.

The record-feed in the present instance comprises a drum 40, herein shown as drawing a strip of paper or the like off of a roll 42, which is held by a tension-spring 43, although this record might be cloth, metal, or anything suitable for receiving the impression of the characters on the indicators. Any suitable means may be employed for turning the drum. In Figs. I and II, I have shown a lever 44, having an actuating-pawl 45, engaging a ratchet 46 on the end of the drum, (47 being a retaining-pawl,) and the tip 48 of this lever stands in the path of the key-bit. By preference it has a spring-actuated knuckle-joint 49 where it is connected with the body of the lever, so as to permit the key to move in the other direction. The entire lever is of such a length and so pivoted that its tip slides off the key-bit, as shown in dotted lines in Fig. II, just as the bit moves the bolt to make the impression, as described below. A slight modification of these features and a simpler construction are shown in Fig. III. Herein the actuating-pawl 450 is pivoted directly to the bolt 6 and is thrown up against the ratchet by a spring 490. The shape and length of this pawl must be such that the feed of the record will be accomplished and finished before the bolt has been moved sufficiently to do the printing, as described below.

The recorder in the present instance is platen adapted to press a paper strip against type which have been inked; but it is clear that this recorder could be a complementary die or a cushion or anything whose function was to impress or imprint the characters of the indicators on or into the record-strip. In fact, the face of the recorder could itself receive the imprint, so that the paper might be omitted. As shown herein, 50 is a platen carried by one end of an arm 51, which is intermediately pivoted, as at 52. Pivoted to the other end of this arm is a push-bar 53, herein shown as hanging therefrom and resting normally against a stop 54. This bar may have an antifriction device, such as a roller 55, at its lower end. Said end stands above the lower extremity of a cam 56, rising from the bolt. It follows that when the latter is thrown inward the active face of the cam raises the push-bar, depresses the platen, and

BEST AVAILABLE COPY makes a record of those characters on the indicator which were at that moment uppermost, and as the bolt is again shot its lower end or heel swings the lower end of the push-bar outward, so that it drops back to the position shown and ready for subsequent use.

The indicators are herein shown as wheels, which form, I presume, is the preferred one; yet I do not limit myself to such a construction. It is clear than an independently-driven time-indicator will not be useful as an "indicator" without some recorder used in conjunction unless mechanism be used to stop its rotation when the bolt is moved. Not only is this idea broadly old, but such a device could then indicate only one point of time, and subsequent employees might enter the building without making a record or giving any indication. It will also be clear that the key-indicator is not useful without the recorder so long as the spring 29 is employed, which returns it to the starting-point after the withdrawal of the key; but by omitting this spring one (and only one) designation could be expressed without the use of the recorder. Hence to make these wheel-indicators in a true sense I may provide their side faces with letters or figures, as shown at 100 in Fig. III, and have openings 101 in the lock-casing, through which these can be seen. I lay no claim to this feature, however, but have described it to show one of a great variety of amplifications and modifications to which the broad idea of this invention is susceptible without departing from its spirit. I might add that it is not inconsistent with the invention to omit either indicator and use only the other, to use both, as shown, or to employ other designators for other purposes when desired.

While I have described the invention as useful in the lock which closes the main door of an establishment, it is clear that the machine could be used as a workman's time-record to check his arrival in the morning and his departure in the evening.

What is claimed as new is—

1. In a lock, the combination with the closure-locking bolt, and differentiated detachable means for controlling it; of a type-carrier set to different positions by said means, and mechanism for obtaining a record from said carrier.

2. The combination with a locking-bolt, and differentiated removable means for controlling and actuating it; of mechanism for designating the operator who manipulated said means, such designating mechanism being moved by said means.

3. In a lock, the combination with the closure-locking bolt, and differentiated detachable means for moving it; of a type-carrier set to different positions by said means, and mechanism for obtaining a record from said carrier.

4. The combination with the main or locking bolt, of a lock, and differentiated detachable means for actuating it; of mechanism for designating the operator who manipulated said means, such designating mechanism being moved by said actuating means.

5. A recording-lock as an organized self-contained device including a locking-bolt, means for moving said bolt, said means being differentiated, and devices for designating the particular means employed for moving the bolt, said devices being operated differentially according to the particular bolt-moving means employed.

6. A recording-lock as an organized self-contained device comprising a closure-locking bolt, means for controlling said bolt, a device carrying characters designating the persons authorized to operate the controlling means, and connections between said means and said device whereby the latter is set to varying positions dependent upon the person responsible for the operation of said means.

7. A recording-lock as an organized self-contained device comprising a member that is moved to varying positions according to the person responsible for the operation of the lock, and a designating device carrying characters representing persons who are authorized to operate the lock, said device being controlled by said member.

8. A recording-lock as an organized self-contained device comprising a member that is representing persons who are authorized to operate the lock, means for moving the designating device, and differentiated mechanism for moving the said means and setting the designating device so as to designate the person responsible for the operation of the lock.

9. A recording-lock as an organized self-contained device comprising the closure-locking bolt; a designating device carrying characters representing persons who are authorized to operate the lock, means for moving the said designating device, and differentiated mechanism for moving the said means and for controlling the bolt.

10. A recording-lock as an organized self-contained device comprising the closure-locking bolt; a designating device carrying characters representing persons who are authorized to operate the lock, means for moving the said designating device, and differentiated mechanism for moving the said means, and for controlling and actuating the bolt.

11. In a recording-lock, the combination with a key-controlled locking-bolt; of recording mechanism, means for making a record by the movement of the bolt, said recording mechanism including a time-indicator and a key-indicator, and mechanism for setting the time-indicator.

12. A recording-lock as an organized self-contained device comprising a key-controlled closure-locking bolt, a time-indicator, a key-

BEST AVAILABLE COP' designator adapted to be set to different positions by the keys, and a recorder for taking an impression from the indicator and designator.

13. In a recording-lock, the combination with a key-controlled locking-bolt; of recording mechanism including an independently-driven time-indicator, and a recorder coöperating therewith and moved by the bolt.

14. In a recording-lock, the combination with a key-operated locking-bolt; of recording mechanism including an independently-driven time-indicator, and a recorder coöperating therewith and moved by the bolt.

15. In a recording-lock, the combination with a key-controlled locking-bolt; of recording mechanism including an independently-driven time-indicator, a recorder coöperating therewith and moved by the bolt, a record-feed, and means for actuating it through the movements of the key.

16. In a recording-lock, the combination with a key-operated locking-bolt; of recording mechanism including an independently-driven time-indicator, a recorder coöperating therewith and moved by the bolt, a record-feed, and means for actuating it through the movements of the key.

17. In a recording-lock, the combination with a key-controlled locking-bolt; of recording mechanism including an independently-driven time-indicator, and a recorder and paper-feed, both moved by the bolt.

18. In a recording-lock, the combination with a key-operated locking-bolt; of recording mechanism including an independently-driven time-indicator, and a recorder and paper-feed, both moved by the bolt.

19. In a recording-lock, the combination with a locking-bolt, a key-indicator and a recording mechanism, of differentiated keys each adapted to operate said bolt-indicator and recording mechanism, said indicator being actuated to varying positions according to the particular key employed.

20. In a recording-lock, the combination with a key-operated locking-bolt; of recording mechanism and means for actuating it through the movement of the key, said mechanism that is actuated by the key including a key-indicator, a recorder, and a record-feed.

21. In a recording-lock, the combination with a key-operated locking-bolt; of recording mechanism including a key-indicator set by the key, an inker, a recorder moved by the bolt, and paper-feeding mechanism also moved by the bolt.

22. In a recording-lock, the combination with a key-operated locking-bolt; of recording mechanism and means for actuating it through the movement of the key, said mechanism comprising time and key indicating dies side by side, an inker for them, a paper-feed for drawing a strip over them, a single platen above such strip, and means for operating the various elements when the bolt is moved by the key, substantially as described.

23. In a recording-lock, the combination with the bolt, and a cam thereon; of an indicator, means for moving it, a recorder, an intermediately-pivoted arm supporting the latter, a push-bar pivoted to the other end of the arm and hanging therefrom normally over the smaller portion of said cam, and a stop for preventing the bar from swinging in the direction in which the cam moves to raise said bar, as and for the purpose set forth.

24. In a recording-lock, the combination with the bolt, and a cam thereon; of an indicator, means for moving it, a recorder, and a bar connected with the recorder and adapted to be struck by the cam when the bolt is moved, as and for the purpose set forth.

25. In a recording-lock, the combination with the bolt, and a pawl connected therewith; of an indicator, a recorder, means for moving them, a paper-roll, a winding-drum therefor engaged by said pawl, and a retaining-pawl for the drum, as and for the purpose set forth.

26. In a recording-lock, the combination with the bolt adapted to be moved by keys having bits of several lengths, an indicator, a recorder coöperating therewith, and means for operating it; of a spring-retracted lever pivoted at one end and having along its edge an active face merging into a neutral face around the keyhole for the purpose set forth, and connections between its other end and said indicator, substantially as described.

27. In a recording-lock, the combination with the bolt adapted to be moved by keys having bits of several lengths, an indicator, a recorder coöperating therewith, and means for operating it; of a spring-retracted lever pivoted at one end and having along its edge an active faee merging into a neutral face around the keyhole for the purpose set forth, a rack-bar pivoted to its other end, and a pinion on the hub of the indicator in mesh with said rack-bar, substantially as described.

28. In a lock the combination with the closure-locking bolt and detachable differentiated means for controlling it, of mechanical means for making an individual record for each controlling means.

29. As an organized device, a lock for a door or other closure, including a locking-bolt, differentiated means for moving said bolt, and mechanical means actuated to different positions according to the particular differentiated means employed for moving the bolt for making a record of the operation of such differentiated means.

30. As an organized device, a lock for a door or other closure including an inclosing casing having an opening therethrough, a locking-bolt, differentiated means adapted to be inserted through the opening in the casing for controlling said bolt, and means arranged within the casing and actuated to different

BEST AVAILABLE COP' positions according to the particular differentiated means employed for making an individual record for each differentiated means.

31. As an organized device, a lock for a door or other closure including a support having an opening, a locking-bolt, differentiated means adapted to be inserted through the opening in said support for controlling said bolt, and mechanical means actuated to different positions according to the particular differentiated means employed for making an individual record for each differentiated means.

32. In a lock, the combination with a locking-bolt, detachable differentiated means for controlling it, a device operated by the differentiated means to set the same to different positions according to the particular differentiated means employed, and means for taking a record from said device when so set.

33. The combination with impression mechism, of independent type-carriers, a clock mechanism for operating one of the type-carriers, manually-operated mechanism for operating the independent type-carrier, means for supporting a record-strip in position to receive an imprint from both type-carriers, and a closure-locking bolt controlled by said manually-operated mechanism.

34. The combination with recording mechanism, of independent record-making devices, a clock mechanism for operating one of said record-making devices, manually-operated mechanism for operating the independent record-making devices, means for supporting a record-strip in position to receive the record from both said record-making devices, and a closure-locking bolt controlled by said manually-operated mechanism.

35. The combination with recording mechism, of independent record-making devices, a clock mechanism for operating one of said record-making devices to recording position, manually-operated mechanism for operating the independent record-making devices to recording position, means for supporting a record-strip in position to receive the record simultaneously from both said record-making devices when the latter are in recording position, and a closure-locking bolt controlled by said manually-operated mechanism.

36. The combination with recording mechanism, of independent record-making devices, a clock mechanism for operating one of said devices, manually-operated mechanism for operating the other of said devices, means arranged to support a record-strip over both of said devices to enable the record-strip to receive a record from each, a closure-locking bolt, and means operated by said manually-operated devices for controlling said bolt, said means also operating to actuate said record-strip-supporting means to shift said strip.

37. In a recording-lock, the combination with a key-operated locking-bolt; of recording mechanism and means for actuating it through the movement of the key, said mechanism including a time-indicator and a key-indicator.

38. In a recording-lock, the combination with a key-operated locking-bolt; of recording mechanism including an independently-driven time-indicator, and a printing mechanism and paper-feed, both moved by the bolt.

39. In a recording-lock, the combination with a key-operated locking-bolt; of recording mechanism including a key-indicator set by the key, an inker, a printing mechanism moved by the bolt, and paper-feeding mechanism also moved by the bolt.

40. In a recording-lock, the combination with the bolt, and a cam thereon; of an indicator, means for moving it, a platen, an intermediately-pivoted arm supporting the latter, a push-bar pivoted to the other end of the arm and hanging therefrom normally over the smaller portion of said cam, and a stop for preventing the bar from swinging in the direction in which the cam moves to raise said bar, as and for the purpose set forth.

41. In a recording-lock, the combination with the bolt, and a cam thereon; of an indicator, means for moving it, a platen, and a bar connected with the platen and adapted to be struck by the cam when the bolt is moved, as and for the purpose set forth.

42. In a recording-lock, the combination with the bolt, and a pawl connected therewith; of an indicator, a platen, means for moving them, a paper-roll, a winding-drum therefor engaged by said pawl, and a retaining-pawl for the drum, as and for the purpose set forth.

43. In a recording-lock, the combination with the bolt adapted to be moved by keys having bits of several lengths, an indicator, printing mechanism coöperating therewith, and means for operating it; of a spring-retracted lever pivoted at one end and having along its edge an active face merging into a neutral face around the keyhole for the purpose set forth, and connections between its other end and said indicator, substantially as described.

44. In a recording-lock, the combination with the bolt adapted to be moved by keys having bits of several lengths, an indicator, printing mechanism coöperating therewith, and means for operating it; of a spring-retracted lever pivoted at one end and having along its edge an active face merging into a neutral face around the keyhole for the purpose set forth, a rack-bar pivoted to its other end, and a pinion on the hub of the indicator in mesh with the said rack-bar, substantially as described.

ALLEN DE VILBISS, JR.

Witnesses:
J. W. CABLE,
F. J. BERGER.